(12) United States Patent
Matsuda

(10) Patent No.: US 6,598,813 B1
(45) Date of Patent: Jul. 29, 2003

(54) CUTTING DEVICE, PROCESSING EQUIPMENT, AND CUTTING METHOD

(75) Inventor: Yutaka Matsuda, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/484,664

(22) Filed: Jan. 18, 2000

(30) Foreign Application Priority Data

Jan. 21, 1999 (JP) .......................................... 11-012805

(51) Int. Cl.⁷ ............................................... B02C 13/28
(52) U.S. Cl. .......................... 241/27; 241/36; 241/187; 241/193; 241/196
(58) Field of Search .......................... 241/36, 194, 195, 241/30, 27, 187, 190, 196, 193

(56) References Cited

U.S. PATENT DOCUMENTS

| | | | | |
|---|---|---|---|---|
| 1,557,444 A | * | 10/1925 | Elzemeyer | 241/193 |
| 1,821,482 A | * | 9/1931 | Schutte | 241/194 |
| 1,893,030 A | * | 1/1933 | Kingsley | 241/193 |
| 2,045,690 A | * | 6/1936 | Armstrong | 241/194 |
| 2,244,577 A | * | 6/1941 | Schreiber | 241/194 |
| 3,695,722 A | | 10/1972 | Fairweather et al. | |
| 4,725,097 A | | 2/1988 | Zelenka | |
| 5,443,216 A | * | 8/1995 | Lajoie | 241/194 |
| 5,562,257 A | * | 10/1996 | Graveman et al. | 241/194 |
| 5,678,773 A | * | 10/1997 | Takamura et al. | 241/189.1 |
| 6,203,113 B1 | | 3/2001 | Wendel | |

FOREIGN PATENT DOCUMENTS

| | | |
|---|---|---|
| DE | 19754371 | 11/1998 |
| JP | 5-337391 | 12/1993 |
| JP | 6-154632 | 6/1994 |
| JP | 7-21739 | 4/1995 |
| JP | 9-276728 | 10/1997 |
| JP | 2000-228578 | 8/2000 |

* cited by examiner

Primary Examiner—Mark Rosenbaum
(74) Attorney, Agent, or Firm—Merchant & Gould, P.C.

(57) ABSTRACT

An impacting body is mounted rotatably to a spindle provided on a principal plane of a rotor. The impacting body is mounted so that a predetermined fitting gap is provided between the impacting body and the spindle and a part of periphery of the impacting body can be positioned beyond a periphery of the rotor. The rotor is rotated at a high speed to allow the impacting body to impact on an object to be processed at least at its critical impact velocity. This enables only the top layer of the object to be processed at the part on which the impacting body has impacted to be broken instantaneously. When the rotor is moved while being rotated, the object to be processed can be cut. According to this cutting device, an object formed of a single member such as glass, ceramics, resin, metal, or the like, or a composite member thereof can be cut continuously with one kind of cutting tool.

15 Claims, 11 Drawing Sheets

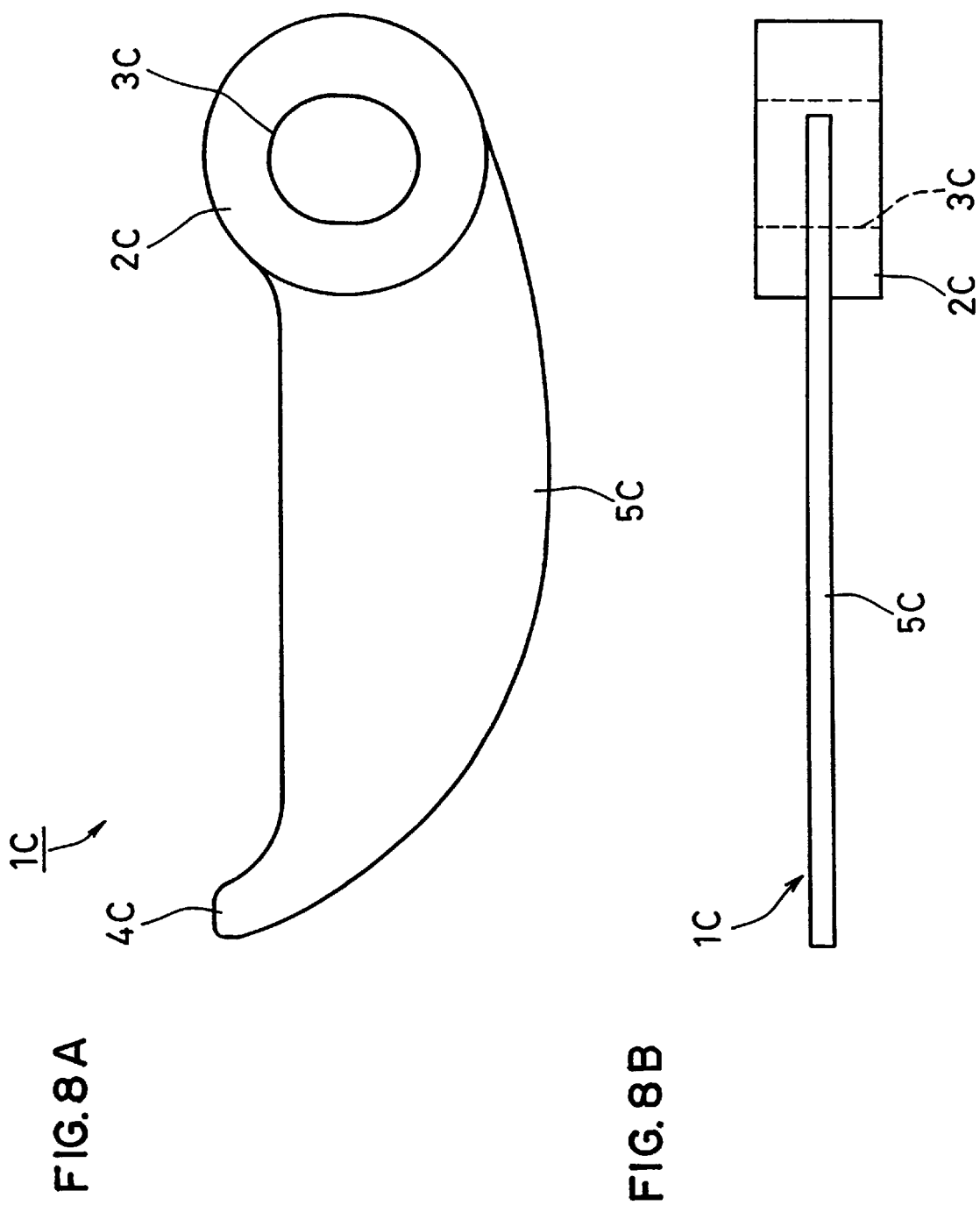

CUTTING DEVICE, PROCESSING EQUIPMENT, AND CUTTING METHOD

FIELD OF THE INVENTION

The present invention relates to a cutting device that can cut an object formed of a single member, such as glass, ceramics, resin, metal, or the like, or a composite member thereof continuously using one kind of cutting tool. More particularly, the present invention relates to a cutting device that cuts an object while smashing the very surface area of the object by allowing an impacting body formed of a hard solid body to impact on the object at a high speed with a high frequency, and to a cutting method using the same.

BACKGROUND OF THE INVENTION

Generally, methods used for cutting and disassembling glass used in a cathode-ray tube (CRT) (herein after referred to as "CRT glass") for the purpose of its recycling include a method of utilizing the thermal shock obtained by winding a heater wire around the CRT and energizing the heater wire to heat the CRT, a cutting method of using a diamond wheel cutter that is rotated at a high speed, a gas fusion cutting method (a method of melting and cutting glass using a gas), or the like.

Generally, sheet steel pieces (cold rolled steel plate sheets and strips cut to length or the like) forming bodies of automobiles and case bodies or other components of various household electric appliances are cut by a band-shaped cutter (a band saw machine) or a disc-shaped cutter (a metal slitting saw), which is provided with a high hardness saw blade, by a grinder cutting method using a grinding tool in which abrasive grains are formed in a disc shape or in a cylindrical shape, or by a gas fusion cutting method using an acetylene gas or the like.

Generally, resin-molded articles are cut by a band saw machine, a metal slitting saw, an end mill, or the like.

In this connection, no cutting device that can cut a member containing different materials such as glass of the CRT or the like, sheet steel, or resin-molded articles or members formed of different materials continuously one after another by rotating one kind of tool (a tool provided with a cutting blade) or by moving it at a high speed has been proposed.

However, in the respective conventional cutting methods described above, there have been the following problems.

(1) In cutting the CRT glass as described above, due to the differences in shape, size, manufacturing processes, or the like of the CRT, the residual stress in the glass also varies and therefore in the method of energizing and heating a heater wire in which the thermal shock is utilized, it is difficult to find out stable cutting and heating conditions or to form a certain stable cut surface.

In the cutting method using a diamond wheel cutter, when the cutting speed is increased, the wear rate of the diamond wheel cutter increases due to frictional heat and therefore the cutting speed is limited. In addition, the diamond wheel cutter is expensive and the cutting amount and the wear rate of the diamond wheel have a close relationship, resulting in high cutting cost.

Furthermore, in the fusion cutting method using a hot gas, the cutting speed is slow and this method is dangerous when combustible materials exist near an object to be cut or a section to be cut. Thus, the applicability of this method is limited.

(2) When the sheet steels are cut using a tool such as a band saw machine, a metal slitting saw, or the like, a cutting blade of the tool is pressed strongly against an object to be cut to cause a continuous shear fracture in the object to be cut, thus cutting and processing the object to be cut.

Since the cutting blade is pressed strongly against the object to be cut, frictional heat is generated greatly at the cutting part. Therefore, the embrittlement and enfeeblement of its cutting edge due to the heat aggravate the abrasion of the cutting edge.

Due to the abrasion of the cutting blade, the cutting speed is lowered considerably and thus is limited. In addition, since the cutting blade is allowed to bite into the object to be cut, a holding mechanism is required to have a high stiffness for holding the tool (a cutter) and the object to be cut, thus requiring a large-scale holding mechanism and a high installation cost.

The grinder cutting method using a grindstone is carried out by causing continuous small shears by cutting blades provided in the abrasive grains. Since the corners (cutting blades) of the abrasive grains are not so sharp and the peripheral speed of the grinder is relatively high, the frictional heat is generated greatly at the cutting part. In order to secure the life span of the grindstone, it is necessary to control the temperature of the cutting part appropriately. Thus, the cutting speed is limited.

In the gas fusion cutting method using a gas such as acetylene, it is important that no combustibles exist in the vicinity of the cutting section in view of safety. Therefore, the applicability of the gas fusion cutting method is limited.

(3) In using a band saw machine, a metal slitting saw, or the like for cutting a resin-molded article or the like, when the cutting speed is increased, the vicinity of the cutting part of an object to be cut starts burning or melts due to the frictional heat generated by the friction with the tool, thus causing a change in physical properties of the object.

(4) When a blade made of a material containing a ferroalloy as a main constituent is used in cutting a metallic magnetic component, the fragments and powder that are produced by cutting an object to be cut are magnetic substances and thus adhere to the edge of the blade. Consequently, the increase in frictional resistance or the damage of the edge lowers the cutting performance of the blade considerably.

(5) It is extremely difficult to cut an object formed of a plurality of members with different physical properties (for example, metal, resin-molded articles, glass, ferrite, or the like) continuously using the same tool.

(6) When the information required for cutting and processing (physical properties or the like) an object is unknown or when an object to be cut is formed of a plurality of members and the shapes and materials of the members hiding behind the surface member are unknown, optimal cutting conditions cannot be found out merely from the image information of the surface and outer shape of the object to be cut. Therefore, the automatic control for optimal cutting is impossible.

SUMMARY OF THE INVENTION

In order to solve the above-mentioned problems, the present invention puts a theory to practical use in a cutting device. The theory is a plastic wave theory in which when a high-speed tensile force is applied at least at a critical impact velocity, a fracture occurs immediately at the part where the force has been applied, or a theory in which when a high-speed compressive force is applied at least at a critical impact velocity, the ductility is deteriorated rapidly and thus the part where the force has been applied is broken even by a small distortion (a phenomenon similar to the embrittlement).

Particularly, a cutting device according to the present invention replaces a conventional tool provided with a blade, and in the cutting device an impacting body formed of a hard solid body such as metal is allowed to impact on an object to be cut (hereinafter referred to as "an object to be processed" or "a work") at a very high speed with a high frequency to generate a plastic wave by the impact energy, thus breaking and removing the part subjected to the impact instantaneously.

In other words, the present invention provides a cutting device based on the following principle: when an impacting body that executes a high speed circular motion impacts on a work at least at the critical impact velocity of the work and then rebounds, the surface of the work in a highly limited area including the part subjected to the impact by the impacting body and its vicinity is smashed (broken) instantaneously into a minute granular state or minute fragments by a high speed compression that occurs together with impact, a high speed tension due to friction, high speed shearing, or the like.

Generally, in processing a work, external forces such as a tensile force, a compressive force, or a shearing force are applied to the work by the movement of a tool and thus the work is distorted or deformed. In this case, when the speed of the tool, i.e. the processing speed, is increased gradually and reaches a certain limitation, the ductility of the work is deteriorated rapidly. This limitation speed is called the critical impact velocity. In the work, the part subjected to the force applied by a tool is broken immediately when the processing speed is increased to the critical impact velocity or more. When utilizing this, by allowing an impacting body to impact on the work at least at the critical impact velocity, only the very surface portion of the work that is subjected to the impact by the impacting body can be broken and removed. By extremely increasing the number of impacts by the impacting body per unit time, this phenomenon can be created repeatedly. Furthermore, by successively changing the position at which the impacting body impacts, only the part on which the impacting body impacts can be removed and processed successively without breaking the portion other than the part in the work. Macroscopically, this can be considered as cutting and processing of the work. According to this cutting method, a relatively smooth cut surface can be obtained.

In order to generate a plastic wave, the impacting body is required to impact on a work at least at the critical impact velocity of the work. Particularly, it generally is preferable that the impact velocity is set to be at least about 139 m/second (about 500 km/hour), more preferably at least about 340 m/second (about 1224 km/hour).

When converted to the peripheral speed of a disc with a diameter of 100 mm, the above-mentioned impact velocities correspond to rotational speeds of at least 26,500 rpm and of at least 65,130 rpm, respectively.

Actually, the critical impact velocity varies depending on the kind of a work. For instance, the critical impact velocities of aluminum, soft steel, stainless steel, and titanium are about 49.7 m/second, 30.0 m/second, 152.3 m/second, and 61.8 m/second, respectively. Therefore, the impact velocity of the impacting body can be changed according to the kind of a work. It is preferred to set the impact velocity of the impacting body to be at least twice, further preferably at least three times, and particularly preferably at least four times as high as the critical impact velocity of the work, because this enables stable cutting.

The impacting body has a through hole and is maintained rotatably by a spindle provided perpendicularly on the rotor with a predetermined fitting gap being provided between the impacting body and the spindle. By providing the fitting gap, the displacement of the impacting body that occurs right after the impacting body has impacted on a work can be absorbed. Preferably, the fitting gap between the spindle for supporting the impacting body and the through hole of the impacting body is set to be at least 2 mm, more preferably about 5 to 10 mm. It is necessary to set the fitting gap to be larger corresponding to the increase in impact velocity of the impacting body. The fitting gap according to the present invention is far beyond the gap value according to the Japanese Industrial Standard (JIS), which generally defines the fitting state between an axis and a bearing, and is two to three orders of magnitude larger than the gap value.

As described above, the processing principle of the present invention is different from a conventional processing principle by utilizing impact. In the conventional processing principle, a cutting blade of a cutting tool is allowed to collide with a work at a low speed (a maximum of about 10 m/second) and the work is deformed in a sequence from elastic deformation to breakage through plastic deformation, thus breaking the surface of the work in a relatively large area.

The impacting body of the present invention is not provided with a sharp cutting blade as in the conventional cutting tool.

Due to the above-mentioned configuration, the cutting according to the present invention is characterized as follows.

(1) According to the smashing (cutting) principle utilizing the high speed compression and high speed tension at least at a critical impact velocity when the impacting body impacts on a work, the frictional heat production at the part to be cut in the work is extremely a little. In addition, the impacting body is air-cooled rapidly by its quick movement and thus the increase in temperature of the impacting body itself also is extremely small.

(2) A cutting tool that executes a rotational motion, a reciprocating motion, or a rectilinear motion is heavily worn away. However, the impacting body of the present invention is subjected to the work hardening by the impact on a work and therefore is hardened as it is used, thus increasing its abrasion resistance.

(3) In the cutting principle of the present invention, the cutting resistance and the frictional resistance are low. As a result, a work is not required to be held and fixed firmly when being cut. In addition, it is not necessary to provide a high stiffness for a spindle for supporting the impacting body, a rotor that rotates at a high speed, a main shaft, a bearing, a robot for holding the main shaft of the rotor, or the like.

(4) By mounting an oscillation detector for detecting an intrinsic oscillatory wave form (or an intrinsic oscillation frequency), which is generated by a rotor depending on the nature of the work when cutting the work, on a multiaxis control robot or the like, processing conditions (the impact velocity of the impacting body, the moving speed, or the like) can be controlled depending on the work to be processed.

(5) Even when a work is formed of a plurality of different members (for example, metal, a resin-molded article, glass, ferrite, or the like) and the inside of the work cannot be seen from the outside, the work can be cut continuously using the same cutting device.

As described above, the cutting device of the present invention has a simple configuration and can achieve the increase in life span and the great improvement in reliability. In addition, since it is not necessary to take into consideration during the cutting process that different materials may be intermixed in a work, the cutting device of the present invention is extremely useful as a smashing or cutting device that is a part of recycling equipment.

Therefore, the present invention can automate scrapping and cutting processes of household electric appliances, automobiles, or the like for the purpose of disposal. According to the present invention, it is not necessary to change the type of cutting tool, processing conditions, or a cutting device according to the kind of an object to be processed or members included in the object. The present invention contributes to the improvement in reliability, the increase in life span of the cutting device and in recycling ratio, the environmental protection, and the efficient use of natural resources.

Specific configurations of cutting devices according to the present invention are described as follows.

A first aspect of the present invention provides a cutting device characterized in that an impacting body is mounted rotatably to a spindle that is provided perpendicularly on a principal plane of a rotor, and the rotor is rotated at a high speed to allow the impacting body to impact on an object to be processed (a work) at least at the critical impact velocity of the object. This cutting device reduces the abrasion of a cutting blade by the impact cutting utilizing a centrifugal force, thus achieving the increase in life span and the improvement in reliability of the cutting device. In addition, the cutting device has no preference for the kind of the object to be processed and enables high speed smashing or high speed cutting.

A second aspect provides a cutting device characterized in that a spindle is provided between a pair of rotors whose principal planes oppose each other, an impacting body is mounted to the spindle rotatably, and the pair of rotors are rotated at a high speed to allow the impacting body to impact on an object to be processed (a work) at least at the critical impact velocity of the object. This cutting device reduces the abrasion of a cutting blade by the impact cutting utilizing a centrifugal force, thus achieving the increase in life span and the improvement in reliability of the cutting device. In addition, the cutting device has no preference for the kind of the object to be processed and enables high speed smashing or high speed cutting.

A third aspect provides a cutting device characterized in that a plurality of cutting units are prepared, each of which is assembled by providing a spindle between a pair of rotors whose principal planes oppose each other and mounting an impacting body to the spindle rotatably, and are mounted to the same main shaft at predetermined intervals, and the main shaft is rotated at a high speed to allow each impacting body to impact on an object to be processed (a work) at least at the critical impact velocity of the object. This cutting device can process a large surface at a time, thus improving the cutting and processing efficiency.

A fourth aspect provides a cutting device characterized in that a plurality of cutting units are prepared, each of which is assembled by providing a spindle between a pair of rotors whose principal planes oppose each other and mounting an impacting body to the spindle rotatably, and are mounted to two axes arranged in parallel, and the two axes are rotated at a high speed in different directions respectively so as to entangle an object to be processed (a work) to allow each impacting body to impact on the object at least at the critical impact velocity of the object. This cutting device has no preference for the material and the kind of the object to be processed and can smash or cut an object at a high speed.

Further, a fifth aspect provides a cutting device characterized in that a plurality of cutting units are prepared, each of which is assembled by providing a spindle between a pair of rotors whose principal planes oppose each other and mounting an impacting body to the spindle rotatably, and are mounted to two axes arranged in parallel so that each of the two axes is provided with a plurality of cutting units at predetermined intervals, and the two axes are rotated at a high speed in different directions respectively so as to entangle an object to be processed (a work) to allow each impacting body to impact on the object at least at the critical impact velocity of the object. This cutting device has no preference for the material and the kind of the object to be processed and can smash or cut an object minutely at a high speed.

A sixth aspect provides processing equipment characterized by mounting a cutting device according to any of the first to third inventions on an arm of a robot with a multiaxis control function. This processing equipment enables three-dimensional processing (processing of a curved surface).

In addition, a seventh aspect is characterized in that the processing equipment of the sixth invention is provided with a control system that detects at least one of an intrinsic oscillatory wave form and an intrinsic oscillation frequency that are generated by the impact of the impacting body on the object to be processed and that controls at least one of the impact velocity and impact direction of the impacting body and the moving speed of the cutting device. The processing equipment enables a constant processing speed or an optimum processing speed for a particular work to be obtained.

An eighth aspect is characterized in that in each cutting device of the first to fifth aspects, the impacting body impacts on the object to be processed at a speed of at least about 139 m/second (about 500 km/hour), preferably with a frequency of at least about 150 times/second. Such a cutting device has no preference for the material and the kind of the object to be processed and can cut an object at a high speed.

A ninth aspect is characterized in that in each cutting device of the first to fifth aspects, the impacting body impacts on the object to be processed at a speed of at least about 340 m/second (about 1224 km/hour), preferably with a frequency of at least about 150 times/second. Such a cutting device has no preference for the material and the kind of the object to be processed and can cut an object at a high speed.

In addition, a tenth aspect is characterized in that in each cutting device of the first to fifth aspects, the impacting body impacts on the object to be processed at a speed of at least twice as high as the critical impact velocity of the object. Such a cutting device has no preference for the material and the kind of the object to be processed and can cut an object at a high speed.

BRIEF DESCRIPTION OF THE DRAWINGS

FIG. 6A is its front view and FIG. 6B is a sectional view taken along line 6B—6B in FIG. 6A.

FIG. 7A is its front view and FIG. 7B is a sectional view taken along line 7B—7B in FIG. 7A.

FIGS. 8A and 8B show yet another example of the impacting body in the cutting device shown in FIG. 1, and FIG. 8A is its front view and FIG. 8B is its side view.

DETAILED DESCRIPTION OF THE INVENTION

Embodiments of the cutting devices according to the present invention will be described with reference to FIGS. 1 to 11 as follows.

First Embodiment

Figure 1:
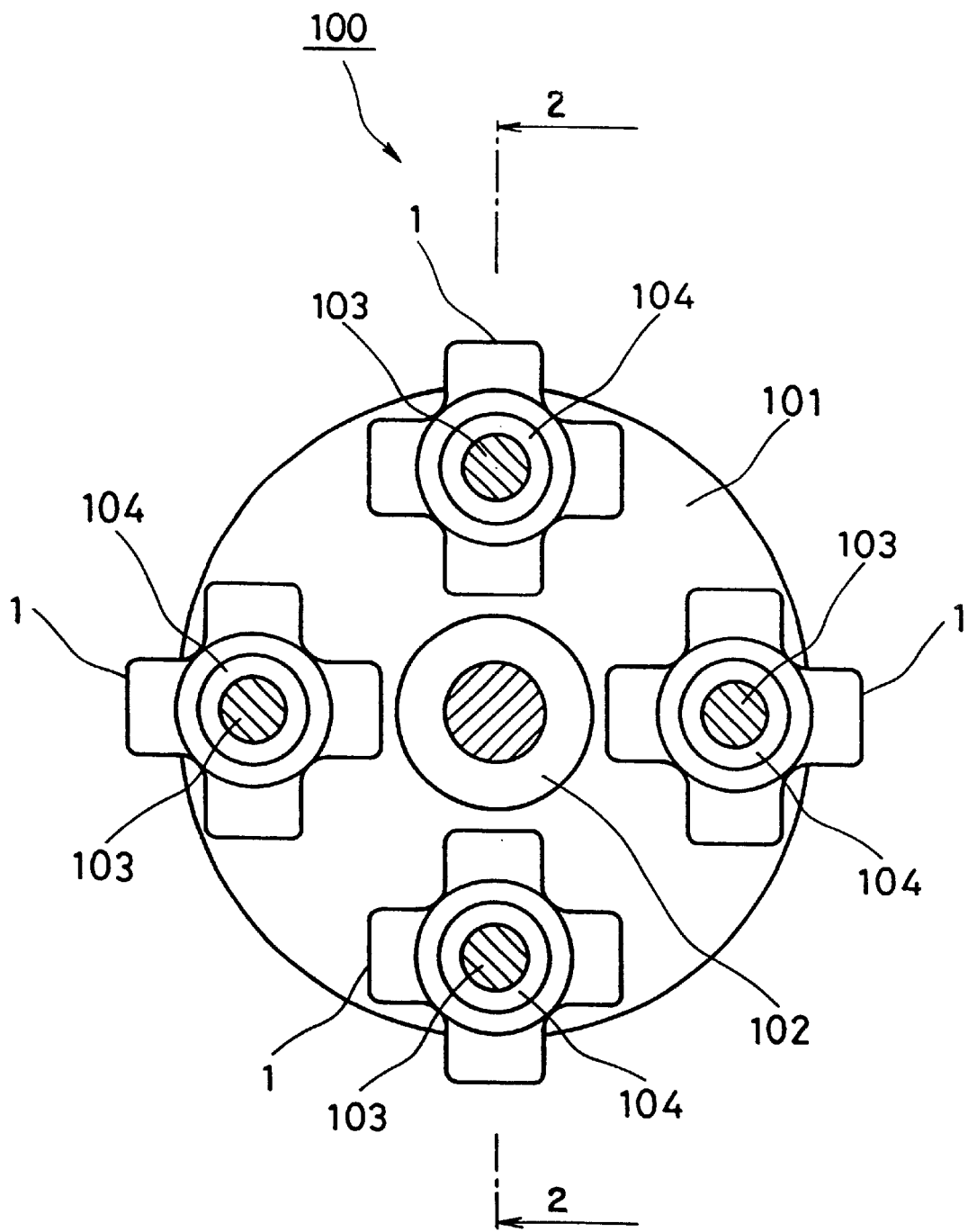
FIG. 1 is a sectional front view of a cutting device according to a first embodiment of the present invention.
Figure 2:
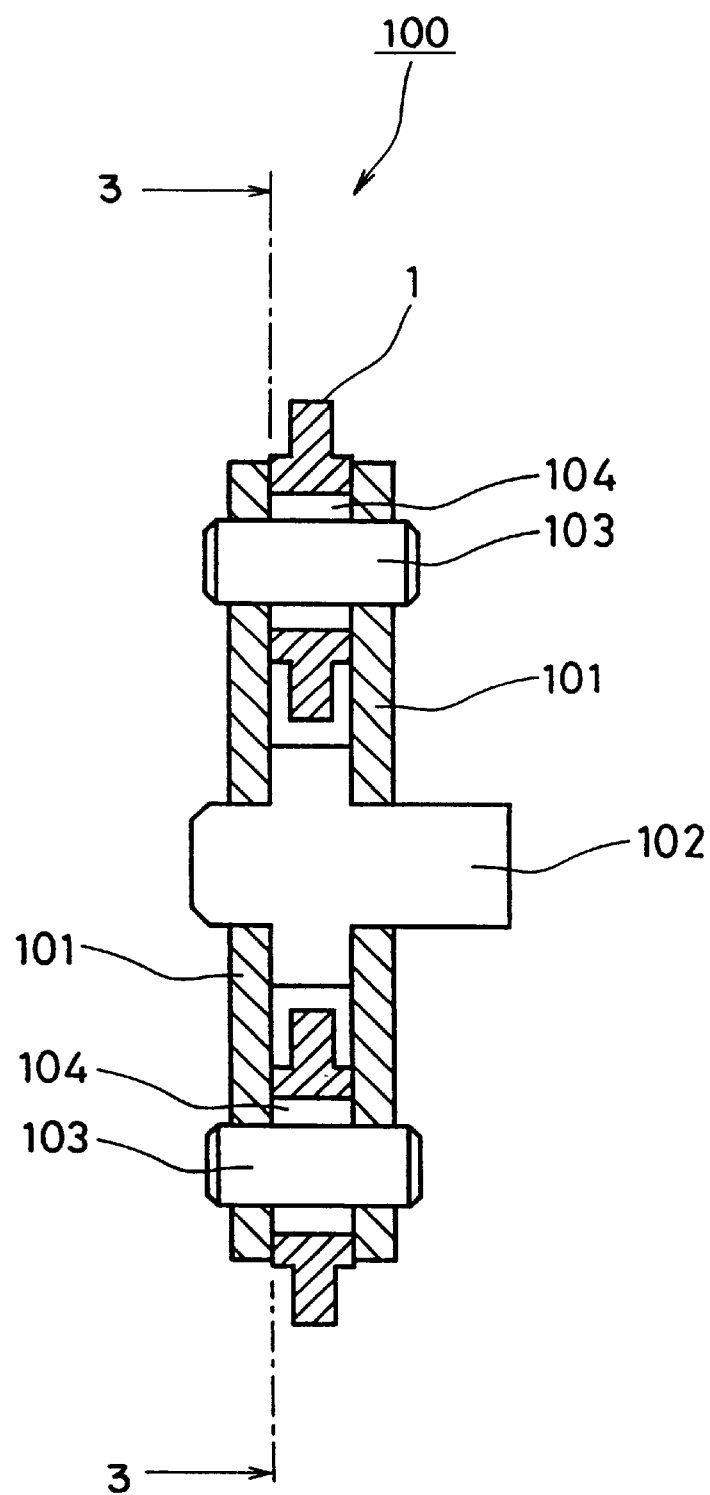
FIG. 2 is a sectional side view, which is taken along 2—2 in the cutting device shown in FIG. 1.
Figure 3:
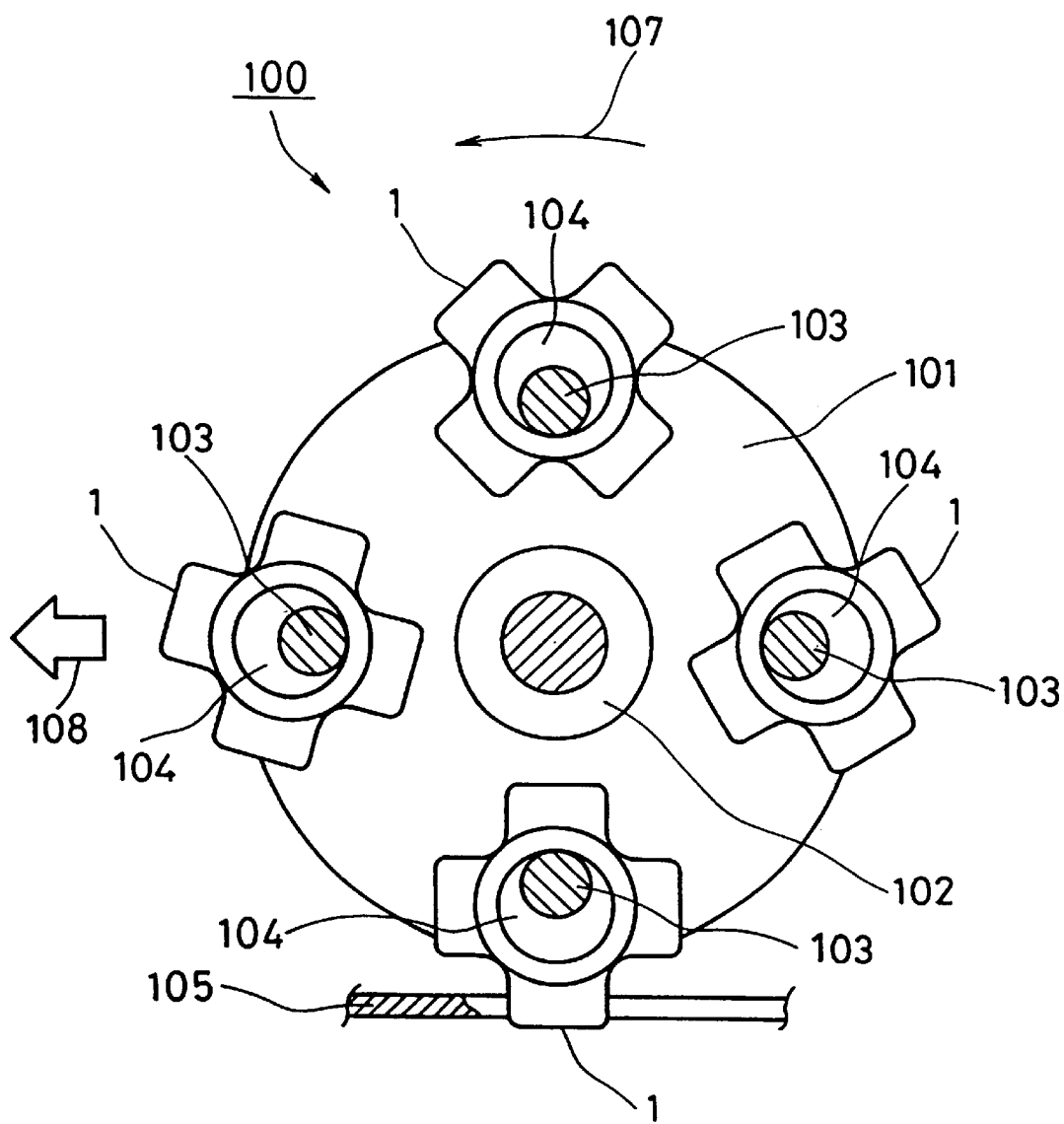
FIG. 3 is a sectional front view of the cutting device shown in FIG. 1 in a state where the cutting device is cutting a work.
Figure 4:
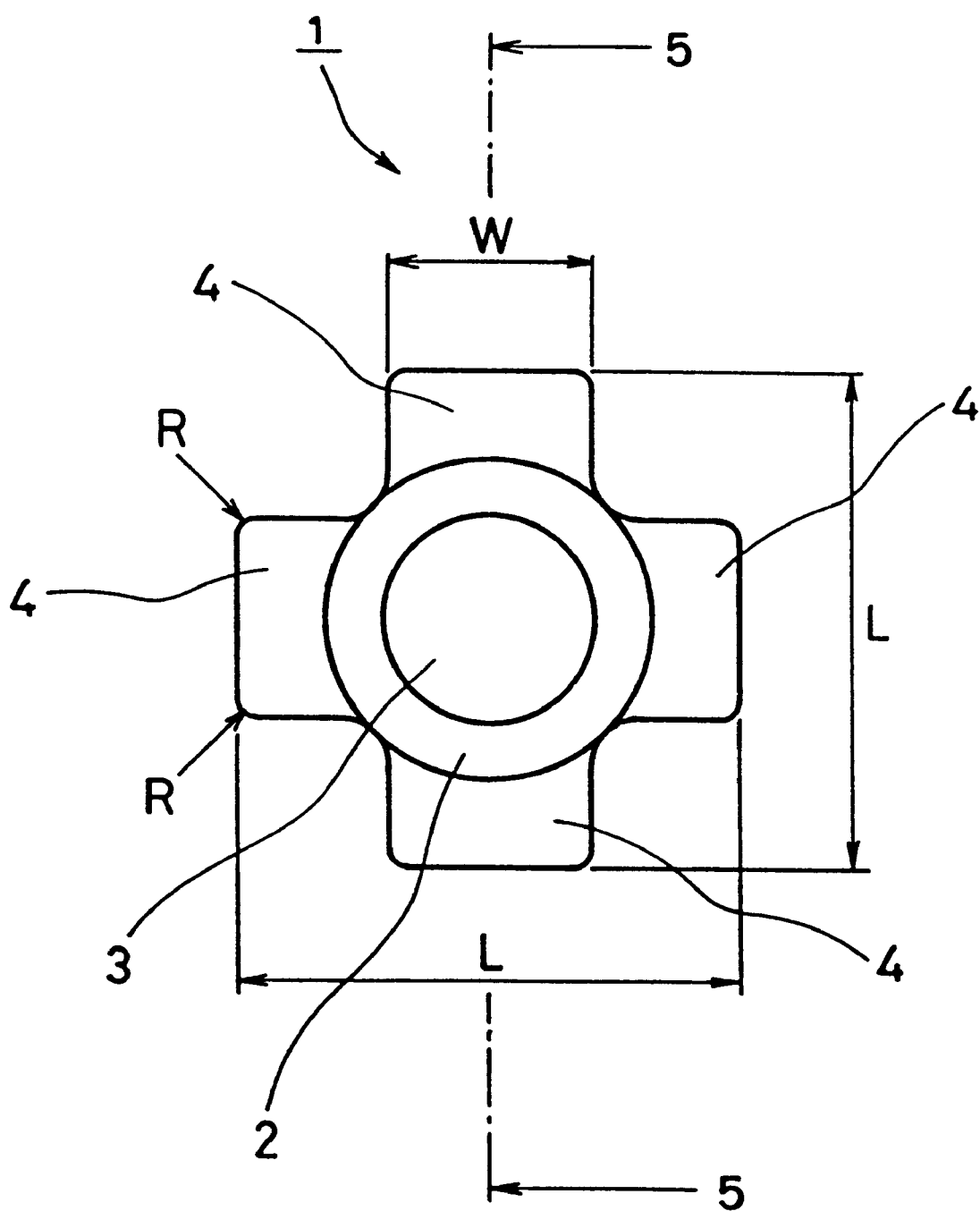
FIG. 4 is a front view of an impacting body constituting the cutting device shown in FIG. 1.
Figure 5:
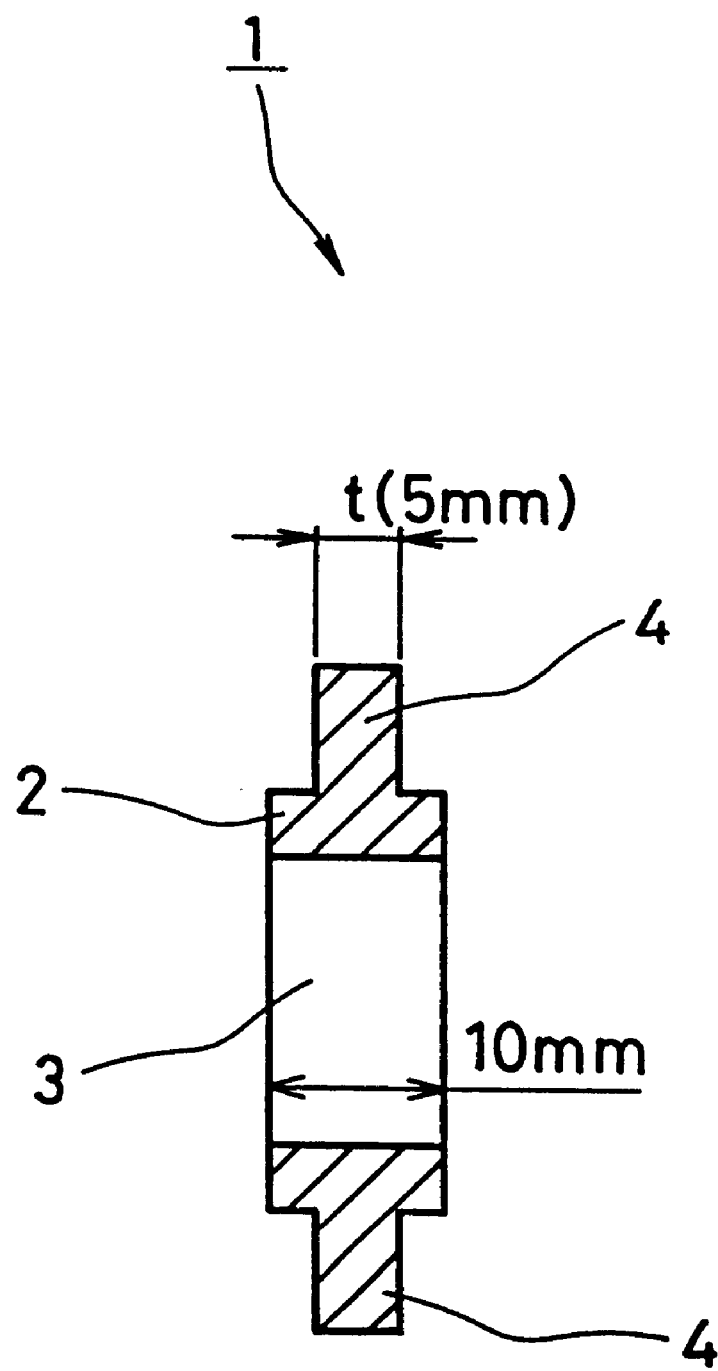
FIG. 5 is a sectional view taken along line 5—5 in the impacting body shown in FIG. 4.

FIG. 1 is a sectional front view of a cutting device according to a first embodiment of the present invention (a sectional view taken along line 3—3 in FIG. 2). FIG. 2 is a sectional side view, which is taken along line 2—2 in the cutting device shown in FIG. 1. FIG. 3 is a sectional front view of the cutting device shown in FIG. 1 in a state where the cutting device is cutting a work. FIG. 4 is a front view of an impacting body constituting the cutting device shown in FIG. 1. FIG. 5 is a sectional view taken along line 5—5 in the impacting body shown in FIG. 4. FIGS. 6A and 6B, 7A and 7B, and 8A and 8B show other examples of the impacting body constituting a cutting device.

As shown in FIGS. 1 to 3, a cutting device 100 according to the first embodiment has the following configuration. Spindles 103 are provided between a pair of discs (rotors) 101, 101 whose principal planes oppose each other. Impacting bodies 1 are mounted rotatably to the spindles 103, respectively. The pair of discs 101, 101 is rotated about a main shaft 102 at a high speed to allow the impacting bodies 1 (hard solid bodies) to impact on a work 105 at least at the critical impact velocity of the work 105. With respect to the rotational speed, a variation of about ±10% is allowable due to the variation in power supply voltage or other reasons.

The impact velocity of the impacting bodies 1 against the work 105 naturally corresponds to the rotational speed of the pair of discs 101. The present embodiment employs a rotational speed in a high rotational speed range of 10,000 to 60,000 rpm as the rotational speed of the pair of discs 101. The high rotational speed range enables, for example, the impact force of the impacting bodies 1 to be increased and the life span to be lengthened by an air-cooling effect and work hardening.

In the cutting device 100 shown in FIG. 1, four impacting bodies 1 (see FIG. 4) with a planar shape of cruciform each of which has four rectangular projections 4 on the peripheral surface of a cylindrical body 2 provided with a through hole 3 are spaced equally between the principal planes of the discs 101. The rectangular projections 4 correspond to cutting blades in a conventional tool and impact on the work 105. As is apparent from FIG. 1, each impacting body 1 is positioned so that a part (each rectangular projection, i.e. each cutting blade 4) of its periphery is positioned beyond the periphery of the discs 101.

Since four impacting bodies 1 are spaced equally between the principal surfaces of the discs 101, the impacting frequency against the work 105 is at least (10,000 rotations/minute)×four impacting bodies=40,000 times/minute.

A predetermined fitting gap 104 is provided between each spindle 103 and the through hole 3 of each impacting body 1 (the fitting gap is set to be about 7 mm in a specific example described later). By providing the fitting gap 104, the impacts on the cutting blades 4 of the impacting bodies 1 and the spindles 103 are relieved although the rotors 101 rotate at a high speed, thus preventing the spindles 103 or the like in the cutting device 100 from being damaged.

Beside the cruciform, the outer shape of the impacting bodies 1 may be designed freely. For instance, the outer shape may be a polygon with a plurality of corners (for example, a regular triangle, a regular square, a rectangle, a regular pentagon, or a regular hexagon), a disc shape, an approximate bow shape, or the like. FIGS. 6A and 6B, 7A and 7B, and 8A and 8B show examples of impacting bodies with a disc shape, a regular hexagonal shape, and an approximate bow shape sequentially.

Figure 6B:
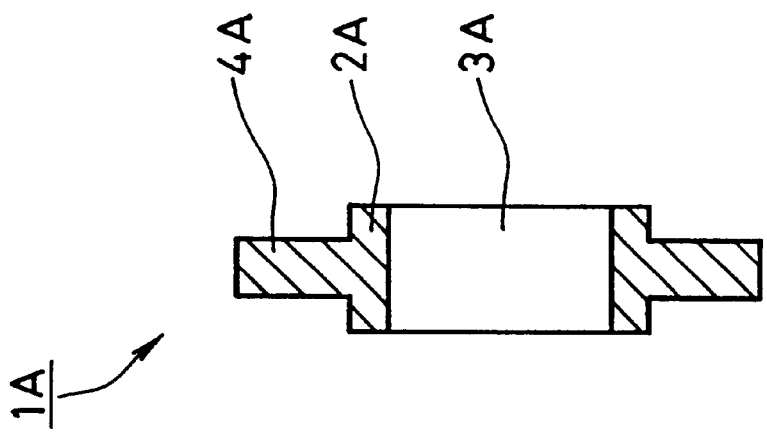
FIGS. 6A and 6B show another example of the impacting body in the cutting device shown in FIG. 1.
Figure 6A:
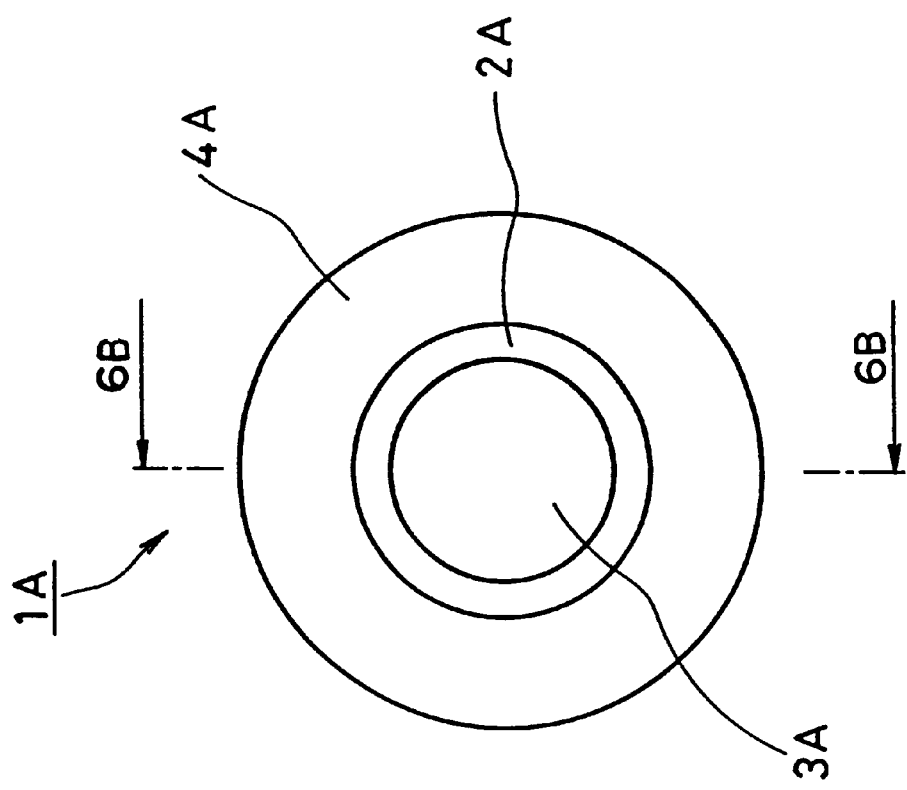

FIGS. 6A and 6B show a disc impacting body 1A, and FIG. 6A is its front view and FIG. 6B is its sectional view. The disc impacting body 1A has a shape such as one obtained by inserting a cylindrical body 2A with a through hole 3A into the center portion of a ring cutting blade 4A with a predetermined thickness.

Figure 7B:
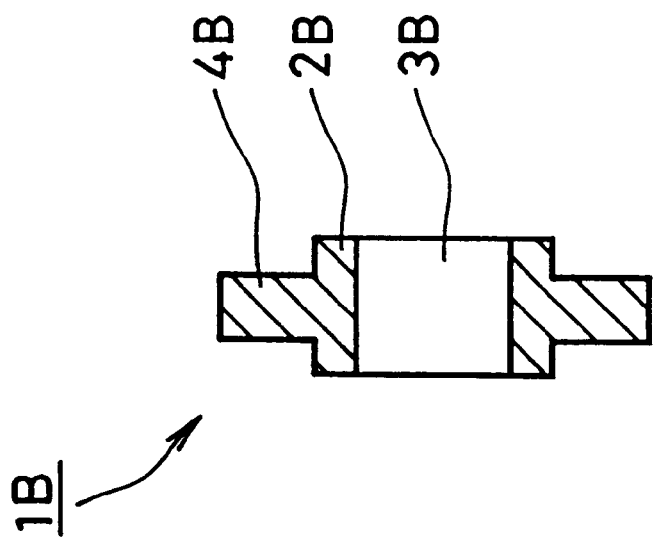
FIGS. 7A and 7B show still another example of the impacting body in the cutting device shown in FIG. 1.
Figure 7A:
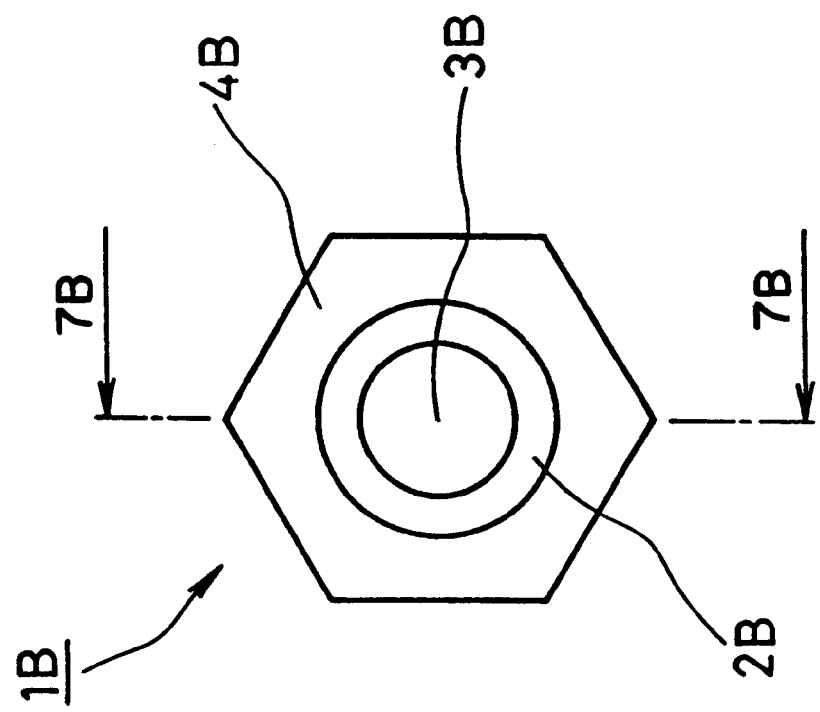

FIGS. 7A and 7B show a regular-hexagonal impacting body 1B, and FIG. 7A is its front view and FIG. 7B is its sectional view. The regular-hexagonal impacting body 1B has a shape such as one obtained by inserting a cylindrical body 2B with a through hole 3B into the center portion of a cutting blade 4B having a regular-hexagonal outer shape and a predetermined thickness.

FIGS. 8A and 8B show an impacting body 1C with an approximate bow shape (a "bow and arrow" type bow shape), and FIG. 8A is its front view and FIG. 8B is its side view. The impacting body 1C with an approximate bow shape shown in FIG. 8A has a floating portion 5C with an approximate bow shape that is formed of an approximate circular-arc portion and a chord extending between the approximate ends of the circular-arc. A cylindrical body 2C having a through hole 3C in its center is formed integrally on one end of the floating portion 5C. A cutting blade 4C is formed at the other end of the floating portion 5C. The impacting body 1C is mounted to a spindle 103 on rotors with the cutting blade 4C facing forward in the rotational direction. The through hole 3C of the impacting body 1C has an elliptical planar shape and is different from the respective through holes 3, 3A, and 3B, each of which has a circular planar shape, in the impacting body 1 shown in FIGS. 4 and 5, the impacting body 1A shown in FIG. 6A, and the impacting body 1B shown in FIG. 7A, which have rotationally symmetrical shapes. Further precisely, the planar shape of the through hole 3C is a circular-arc elliptical shape that is formed by two circular arcs with different radiuses whose centers are the center of gravity of the impacting body 1C and semicircles at their both ends in the circumferential direction. By forming the through hole 3C to be a circular-arc elliptical hole with the two circular arcs whose centers are the center of gravity of the impacting body 1C, the displacement of the impacting body 1C when the impacting body 1C rebounds after impacting on a work can be absorbed excellently, thus improving the cutting performance.

Further, besides the disc type, the rotors 101 may have an arbitrary shape such as a regular polygon. However, it naturally is necessary that the rotors be balanced during rotation.

Next, examples of dimensions and materials of the rotors and the impacting bodies are described. In the device according to the embodiment shown in FIG. 1, the following dimensions and materials were used. Each disc 101 had a diameter of 100 mm and a plate thickness of 5 mm. The material used for the discs 101 was carbon steel for machine structural use. Each spindle 103 had a diameter of 10 mm and its material was carbon steel for machine structural use or carbon tool steel (JIS code: SK2). In each impacting body 1, the distance L between top parts of two cutting blades 4 was about 40 mm, a through hole 3 had a diameter of 17 mm, each cutting blade 4 had a width w of about 15 mm and a thickness t of about 5 mm. The material used for the impacting body 1 was any one selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430), manganese steel for machine structural use (SMn433), and the like.

In the example of cutting a work, which is shown in FIG. 3, the disc 101 was rotated at 30,000 rpm in the direction indicated by an arrow 107. The impact velocity of the impacting bodies 1 against the work (cold rolled steel plate sheet and strip cut to length with a thickness of 0.8 mm) 105 was set to be about 157 m/second (565 km/hour) and the moving speed for cutting to be 50 mm/second. The cutting direction was the direction indicated by an arrow 108. In this case, the impacting frequency was (30,000 rotations/minute)×four impacting bodies=120,000 times/minute.

Since the main shaft 102 rotates at a high speed of 30,000 rpm, a great centrifugal force acts on the impacting bodies 1. The centrifugal force causes a high-speed compressive force accompanied with impacts in a limited area in the work 105 including the surface of the work 105 subjected to the impact (hereinafter referred to as an "impact surface") by the cutting blades 4 of the impacting bodies 1 and the vicinity of the impact surface. Thus, the top layer of the impact surface of the work 105 is smashed at a high speed instantaneously. Cut scraps are in a minute granular state. It has been confirmed by a test that the work 105 can be cut even when no sharp cutting blade is provided.

In addition, a glass included in a CRT also was cut and processed under the above-mentioned processing conditions. It also was confirmed by a test that plastic contained in a resin circuit board for circuit use, a resin-molded article, or the like was processed under the following conditions: the rotational speed of the discs 101 was 10,000 rpm, the number of impacts by the impacting bodies 1 was 40,000 times/minute (four impacting bodies were mounted between the rotors), and the moving speed for cutting was 50 mm/second.

In the above, the impact velocity of the impacting bodies 1 is not limited to the above-mentioned specific example and can be set freely depending on the kind of a work, cutting conditions, or the like as long as the impact velocity is at least the critical impact velocity of the work. Similarly, the number of impacts by the impacting bodies 1 per unit time also can be changed depending on the kind of a work, cutting conditions, or the like.

For instance, when the material of a work is unknown, when a work is formed of a plurality of different kinds of members, or when a member whose material is unknown hides in a part that cannot be seen from the outside, such a work can be cut excellently by setting the impact velocity of the impacting bodies to be somewhat higher.

With respect to the material of the impacting bodies, members other than metallic members also can be used freely as long as they are hard solid bodies.

Furthermore, the number of impacting bodies used may be only one or at least two. In the case of providing a plurality of impacting bodies, it is preferred to provide them at equal angles with respect to the rotational center of the rotors, since this results in equal impact intervals to enable stable cutting. In the case of using only one impacting body, a balancer (a weight) is provided to secure the rotational balance.

Instead of arranging the pair of rotors 101 so that their principal surfaces oppose each other, only one rotor may be used and impacting bodies may be provided on its one side.

The rotor may be driven to be rotated at a high speed using a general spindle motor or the like.

The impacting bodies 1 of the present invention are not provided with sharp cutting blades as in a conventional cutting tool. The cutting principle of the present invention goes beyond a conventional practical sense and enables even brittle members such as metal, resin, glass, ceramics, or the like to be cut without using sharp cutting blades by providing the impacting bodies 1 with a far higher speed than that in a conventional cutting tool.

Second Embodiment

Figure 9:
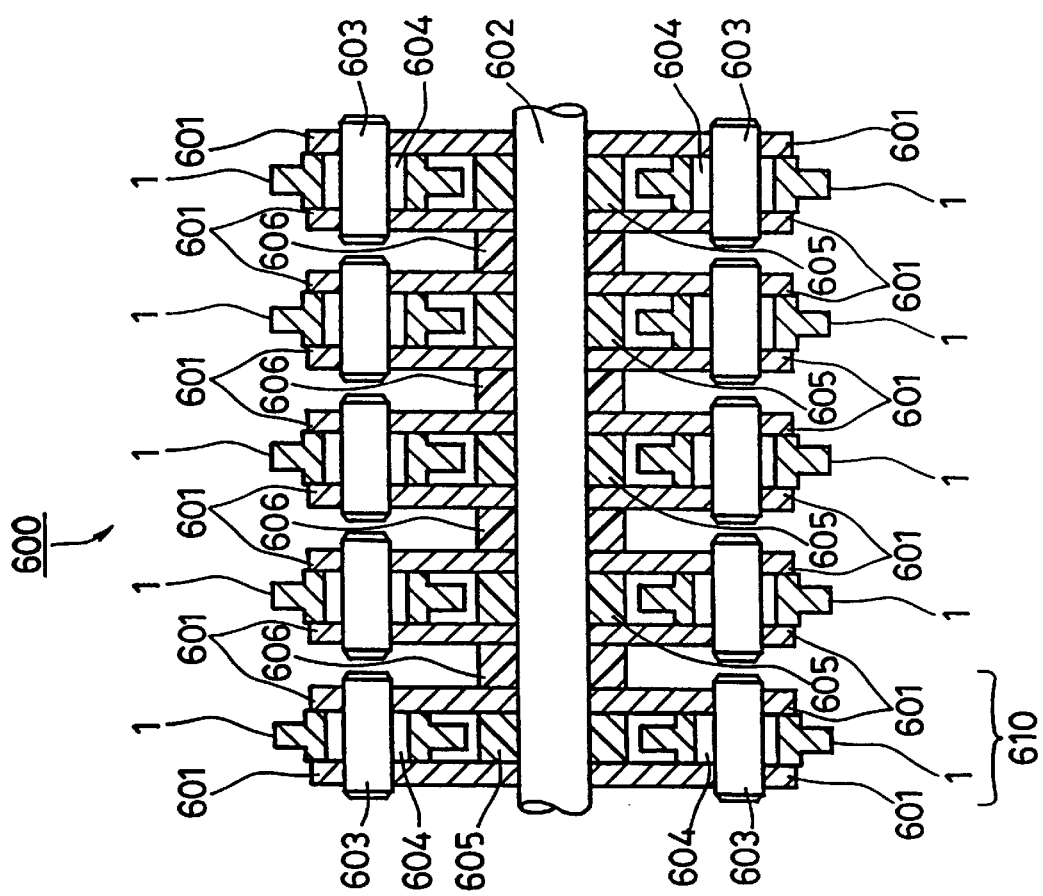
FIG. 9 is a sectional front view of a cutting device according to a second embodiment of the present invention.

FIG. 9 shows a sectional view of a cutting device 600 according to a second embodiment of the present invention. In this case, using the cutting device of the first embodiment as a unit, the cutting device 600 is assembled by mounting a number of units to one axis. Therefore, the cutting mechanism, cutting and processing conditions, and the like are set to be the same as in the first embodiment. In FIG. 9, numeral 600 indicates a cutting device, numeral 601 discs (rotors), numeral 602 a main shaft, numeral 603 spindles, numeral 604 fitting gaps, numerals 605 and 606 spacers, and numeral 610 a cutting unit.

The cutting device 600 shown in FIG. 9 is characterized as follows. A plurality of cutting units 610 are prepared, each of which is assembled by providing the spindles 603 between a pair of rotors 601, 601 whose principal surfaces oppose each other via the spacer 605 and mounting impacting bodies 1 to the spindles 603 rotatably. The cutting units 610 are mounted to the same main shaft 602 at predetermined intervals via the spacers 606. The main shaft 602 is rotated at a high speed to allow the impacting bodies 1 to impact on an object to be processed (a work) at least at the critical impact velocity of the work.

The number and the arrangement pitch of the cutting units 610 to be arranged, the number of the impacting bodies 1 to be mounted between the rotors 601, the impact velocity of the impacting bodies 1, or the like may be set freely depending on the work.

With respect to the support for the main shaft 602, a cantilever bearing structure, a double-end support bearing structure, or the like may be employed freely.

Third Embodiment

Figure 10:
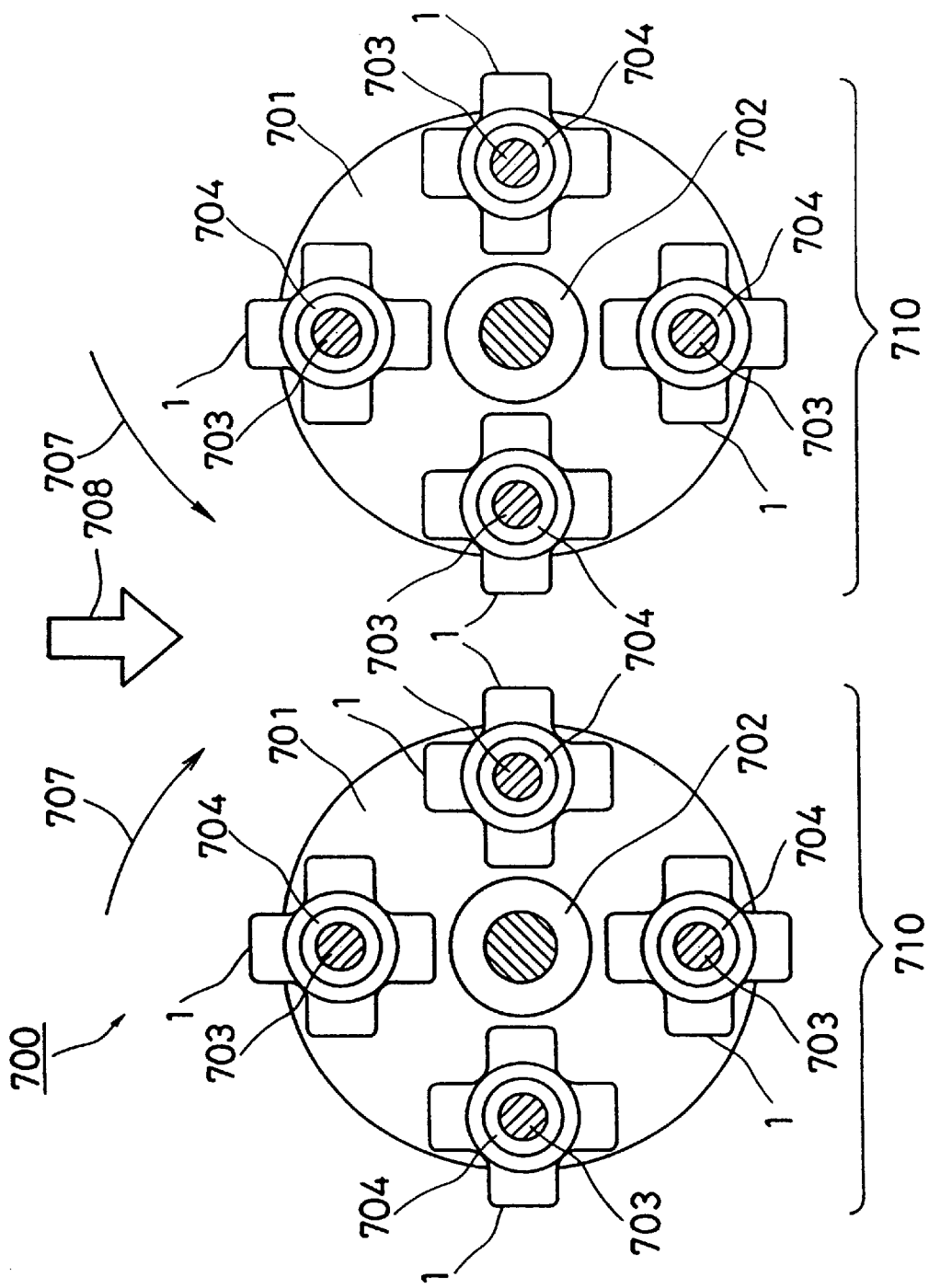
FIG. 10 is a sectional front view of a cutting device according to a third embodiment of the present invention.

FIG. 10 shows a sectional front view of a cutting device 700 according to a third embodiment of the present invention. In this case, the cutting device 700 is obtained by positioning cutting devices according to the first embodiment at a predetermined interval so that their rotational main shafts are arranged in parallel. Therefore, the cutting mechanism, the cutting and processing conditions, and the like are the same as in the first embodiment.

FIG. 10 shows an example of such a cutting device and is characterized as follows. A plurality of cutting units 710 are prepared, each of which is assembled by providing spindles 703 between a pair of rotors 701 whose principal surfaces oppose each other and mounting impacting bodies 1 to the spindles 703 rotatably. The cutting units 710 are mounted to two main shafts 702 arranged in parallel. The two main shafts 702 are rotated at a high speed in the different directions as indicated by arrows 707 so as to entangle an object to be processed (a work), thus allowing the respective impacting bodies 1 to impact on the work at least at the critical impact velocity of the work. In the figure, numeral 704 indicates a fitting gap between a through hole of an impacting body 1 and a spindle 703 and numeral 708 denotes the direction in which the work is fed.

The number and the arrangement pitch of the cutting units 710 to be arranged, the number of the impacting bodies 1 to be mounted between the rotors 701, the impact velocity of the impacting bodies 1, or the like may be set freely depending on the work.

With respect to the support for the main shaft 702, a cantilever bearing structure, a double-end support bearing structure, or the like may be employed freely.

As in the second embodiment, a number of cutting units 710 may be mounted to one main shaft and may be spaced at predetermined intervals (not shown in the figure).

Particularly, the following configuration may be employed. A plurality of cutting units are prepared, each of which is assembled by providing spindles between a pair of rotors whose principal surfaces oppose each other and mounting impacting bodies 1 to the spindles rotatably. The plurality of cutting units are mounted at predetermined intervals to two main shafts arranged in parallel so that each of the two main shafts is provided with a plurality of cutting units. The two main shafts are rotated at a high speed in different directions so as to entangle an object to be processed (a work), thus allowing each impacting body to impact on the work at least at the critical impact velocity of the work.

Fourth Embodiment

Figure 11:
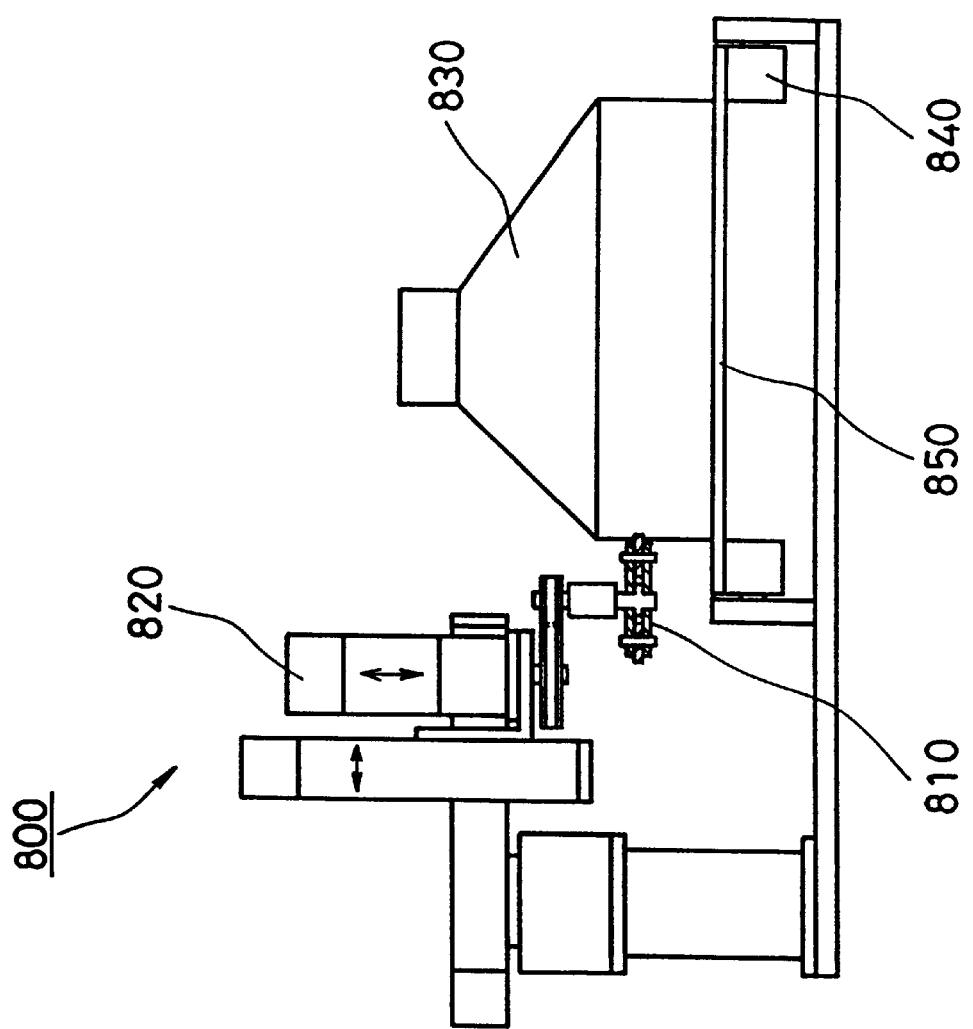
FIG. 11 is a side view of processing equipment according to a fourth embodiment of the present invention.

FIG. 11 shows the side view of cutting and processing equipment according to a fourth embodiment of the present invention. In this case, the cutting and processing equipment has the configuration in which the cutting device of the first embodiment is mounted to the arm of a robot controlled with five axes (X axis, Y axis, Z axis, angle $\Theta 1$, and angle $\Theta 2$) (not shown in the figure).

In FIG. 11, numeral 800 indicates the cutting and processing equipment, numeral 810 the cutting device described in the first embodiment, numeral 820 a commercially available robot controlled with five axes, numeral 830 an object to be processed (a work, for example, a resin-molded cabinet of electronic equipment or the like), numeral 840 a roller conveyor for carrying a carrier pallet, and numeral 850 a carrier pallet on which the work is loaded.

When the work 830 loaded on the carrier pallet 850 is placed in front of the cutting device 810, which is detected automatically, the cutting device 810 mounted to the arm of the robot 820 is rotated and driven. Thus, the periphery of the cabinet 830 is cut and processed in a predetermined manner by the five-axes control function (not shown in the figure).

As the processing conditions, the impact velocity of the impacting bodies is set to be at least the critical impact velocity of the work 830.

The above-mentioned equipment may be provided with a following control system (not shown in the figure). The control system detects at least one of an intrinsic oscillatory wave form and an intrinsic oscillation frequency that are caused by the impact of the impacting bodies against the work 830 and controls at least one of the impact velocity and impact direction of the impacting bodies and the moving speed of the cutting device 810. In this case, for instance, even when the work 830 is formed of a plurality of members with different physical properties, even when the material of the work 830 is unknown, or even when the internal structure of the work 830 that cannot be seen from the outside is unknown, optimum cutting conditions can be set automatically, thus achieving the automation of the cutting work.

Of course, the conveyor system may be a belt conveyor or a chain conveyor.

Furthermore, besides the cutting device of the first embodiment, the cutting device of the second embodiment may be driven by a robot.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A cutting device, comprising:
   a pair of rotors positioned so that their principal planes oppose each other;
   a spindle provided between the pair of rotors; and
   at least one impacting body mounted on the spindle rotatably,
   wherein the impacting body is mounted so that a predetermined fitting gap is provided between the impacting body and the spindle and a part of periphery of the impacting body can be positioned beyond peripheries of the rotors, and
   the rotors are rotated at a high speed to allow the impacting body to impact on an object to be processed at least at a critical impact velocity.

2. The device according to claim 1, wherein a plurality of the impacting bodies are spaced at equal angles with respect to a rotational center of the rotors.

3. The device according to claim 1, wherein the fitting gap between the spindle and the impacting body is at least 2 mm.

4. The device according to claim 1, wherein the fitting gap between the spindle and the impacting body is about 5 to 10 mm.

5. The device according to claim 1, wherein an outer shape of the impacting body is any one of a polygon with a plurality of corners, a cruciform with a plurality of corners, a disc shape, and an approximate bow shape.

6. The device according to claim 1, wherein the impacting body is allowed to impact on the object to be processed at a speed of at least about 139 m/second.

7. The device according to claim 1, wherein the impacting body is allowed to impact on the object to be processed at a speed of at least about 340 m/second.

8. The device according to claim 1, wherein the impacting body is allowed to impact on the object to be processed at a speed of at least twice as high as the critical impact velocity of the object to be processed.

9. The device according to claim 1, wherein the impacting body is configured to impact a surface of the object to be processed to smash the surface.

10. A cutting device, comprising:
   a plurality of cutting units, each of which comprises a pair of rotors positioned so that their principal planes oppose each other, a spindle provided between the pair of rotors, and at least one impacting body mounted to the spindle rotatably; and
   a main shaft to which the plurality of cutting units are mounted at predetermined intervals,
   wherein the impacting body is mounted so that a predetermined fitting gap is provided between the impacting body and the spindle and a part of periphery of the impacting body can be positioned beyond peripheries of the rotors, and
   the main shaft is rotated at a high speed to allow each impacting body to impact on an object to be processed at least at a critical impact velocity.

11. A cutting device, comprising:
   a plurality of cutting units, each of which comprises a pair of rotors positioned so that their principal planes oppose each other, a spindle provided between the pair of rotors, and at least one impacting body mounted to the spindle rotatably; and
   two axes arranged in parallel to which the plurality of cutting units are mounted,
   wherein the impacting body is mounted so that a predetermined fitting gap is provided between the impacting body and the spindle and a part of periphery of the impacting body can be positioned beyond peripheries of the rotors, and
   the two axes are rotated at a high speed in different directions to allow each impacting body to impact on an object to be processed at least at a critical impact velocity.

12. A cutting device, comprising:
   a plurality of cutting units, each of which comprises a pair of rotors positioned so that their principal planes oppose each other, a spindle provided between the pair of rotors, and at least one impacting body mounted to the spindle rotatably; and
   two axes arranged in parallel to which the plurality of cutting units are mounted at predetermined intervals with each of the two axes being provided with a plurality of cutting units,
   wherein the impacting body is mounted so that a predetermined fitting gap is provided between the impacting body and the spindle and a part of periphery of the impacting body can be positioned beyond peripheries of the rotors, and
   the two axes are rotated at a high speed in different directions to allow each impacting body to impact on an object to be processed at least at a critical impact velocity.

13. Processing equipment, comprising:
   a device to break an object to be processed in a limited area subjected to impact, the device including:
      a pair of rotors positioned so that their principal planes oppose each other;
      a spindle provided between the pair of rotors; and
      at least one impacting body mounted on the spindle rotatably,
      wherein the impacting body is mounted so that a predetermined fitting gap is provided between the impacting body and the spindle to relieve stress and a part of periphery of the impacting body can be positioned beyond peripheries of the rotors,
      the rotors are rotated at a high speed to allow the impacting body to impact on the object to be processed at least at a critical impact velocity, and
   wherein the device is mounted to an arm of a robot with a multiaxis control function.

14. The processing equipment according to claim 13, comprising a control system that detects at least one of an intrinsic oscillatory wave form and an intrinsic oscillation frequency that are generated by an impact of the impacting body on the object to be processed and controls at least one of an impact velocity and impact direction of the impacting body and a moving speed of the cutting device.

15. A method of breaking an object to be processed, comprising:
   providing a device, including:
      a pair of rotors positioned so that their principal planes oppose each other;
      a spindle provided between the pair of rotors; and
      at least one impacting body mounted on the spindle rotatably,
      wherein the impacting body is mounted so that a predetermined fitting gap is provided between the impacting body and the spindle to relieve stress and a part of periphery of the impacting body can be positioned beyond peripheries of the rotors, and
      the rotors are rotated at a high speed to allow the impacting body to impact on the object to be processed at least at a critical impact velocity, and
   allowing the impacting body to impact on the object to be processed at least at the critical impact velocity of the object to be processed.

* * * * *